JONAS W. AYLSWORTH, OF EAST ORANGE, NEW JERSEY, ASSIGNOR, BY DIRECT AND MESNE ASSIGNMENTS, TO FIREPROOF PRODUCTS COMPANY, A CORPORATION OF NEW JERSEY.

FIREPROOF MATERIAL.

No. 914,222.     Specification of Letters Patent.     Patented March 2, 1909.

Application filed May 9, 1907. Serial No. 372,688.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Fireproof Material, of which the following is a description.

This invention relates to improvements in fire-proofing of normally inflammable fibers of animal and vegetable origin and materials made therefrom, such as wood for the construction of ships, dwellings and furniture; fabrics like carpets, interior hangings, theater curtains, wall paper, etc. or in fact any inflammable material of a fibrous or absorbent nature which it may be desirable to make fireproof or substantially fireproof. While no inflammable materials of organic origin can be made wholly incombustible since all such materials will decompose and char when heated sufficiently; yet they can be made flame-proof or flame resisting; *i. e.*, so that they will neither ignite on contact with a flame nor themselves emit flame when heated for a moderate length of time. This is the commercial sense of the word fireproof and is the one employed herein.

Many inorganic substances, such as water solutions of alum or of tungstates, have been proposed and used for fireproofing in the prior art, but these substances do not prevent evolution of combustible gases or production of flame when material impregnated therewith is heated to a sufficiently high temperature, merely acting to retard ignition in some degree. Wood, therefore, which has been impregnated with these inorganic substances will burn readily enough when subjected to a sufficiently high temperature. Moreover, presence of relatively harsh crystals of these inorganic materials within the pores of wood makes such wood difficult to work with ordinary tools.

I have discovered that by chlorinating naphthalene as far as possible in the manner set forth in my copending applications, Serial Nos. 372,689 and 372,690, both filed May 9, 1907, I can produce novel chlorin derivatives which may be usefully employed for fireproofing fibrous materials. Briefly stated, this process, as described in said copending applications, consists in chlorinating naphthalene as far as possible by the action of chlorin, preferably electrolytic, while maintaining the naphthalene under heat and pressure.

Theoretically, naphthalene is capable of yielding a large number of chlorin derivatives, forming both additive and substituted compounds, and very many of these have been isolated in the pure state, all showing specifically different properties as regards melting point, volatility and hardness or consistency. Even among isomers of the same centesimal composition, these properties may vary widely. While all these derivatives are useful fireproofers to a degree corresponding to the percentage of contained chlorin and to some extent to the physical properties, since they are relatively incombustible and upon heating yield flame-diluting and flame-stifling vapors of various chlorin compounds, yet it is by no means a matter of indifference which are used since their physical properties, as stated, vary considerably.

While the fireproofing material produced by chlorinating naphthalene in the described manner is probably not a single, simple substance since its properties do not correspond exactly with those of any one of the chlorinated naphthalene derivatives known in the pure state, and while its properties are probably the result of the mutual modification of properties of a number of such mixed derivatives, yet in carrying out such process in a uniform manner upon ordinary naphthalene uniform results are obtained and for the present purposes the product which is uniformly obtained may be treated as a simple substance. The properties of this substance are very advantageous for the present purposes since it combines a convenient melting point of about 262° F. with a high subliming point, subliming without decomposition at about 600°; is soluble in a number of solvents such as chloroform, carbon tetrachlorid and naphtha; and contains a very high per cent. of chlorin, containing about 68 per cent. It is a waxlike body and not harsh or brittle, so that when used to impregnate wood and the like it in no way affects the workable character in an injurious way. As a matter of fact, it preserves the wood and makes it dense and waterproof, being insoluble in water. It may be applied to wood and other fibrous materials in a molten state, such material being saturated or coated as may be desired. Or the substance may be applied as a solution in a volatile solvent, the solvent being afterward evaporated away from or dried out of the treated material. The material may be dipped in such a solution or the solution may be applied with a brush.

Wood and like fibrous materials treated with the described substance are efficiently fireproofed, it being impossible to ignite them by contact with flame; and when placed in a fire of considerable size, such treated materials evolve incombustible vapors, diluting and extinguishing combustible vapors, so that such materials do not produce flame. The incombustible vapors are probably partly those of the fireproofing material itself; partly various carbon chlorids produced by its decomposition under the heat. While the fireproofed material may be exposed to temperatures as high as 430° F. without enough evaporation, sublimation or decomposition of the fireproofer to make such treated material inflammable. At higher heats the material slowly volatilizes, giving off uninflammable vapors.

Because of its waxy consistence, the described new fireproofing substance is easily employed and handled; its convenience in this respect making it adaptable for purposes where its fireproof qualities are of subordinate importance. Having a specific gravity of about 1.850 it is dense and well suited for waxing wood to render it fireproof and for other purposes.

What I claim is:

As a new article, fiber impregnated with a chlorinated derivative of naphthalene, such derivative containing about 68 per cent. of chlorin, having a melting point of about 262° F., being soluble in chloroform, carbon tetrachlorid and naphtha, having a specific gravity of about 1.850 and being waxlike in consistence.

This specification signed and witnessed this 7th day of May, 1907.

JONAS W. AYLSWORTH.

Witnesses:
 FRANK L. DYER,
 FRANK D. LEWIS.